United States Patent

[11] 3,566,116

| [72] | Inventor | William B. Nelligan |
| | | Danbury, Conn. |
| [21] | Appl. No. | 592,795 |
| [22] | Filed | Nov. 8, 1966 |
| [45] | Patented | Feb. 23, 1971 |
| [73] | Assignee | Schlumberger Technology Corporation |
| | | Houston, Tex. |

[54] METHOD AND APPARATUS FOR MEASURING NEUTRON CHARACTERISTICS OF A MATERIAL SURROUNDING A WELL BORE
33 Claims, 7 Drawing Figs.

[52] U.S. Cl............................................. 250/831,
250/71.5, 250/83.6, 250/83.3
[51] Int. Cl............................................. G01t 1/17,
G01v 5/00
[50] Field of Search............................................. 250/83.1,
83.6 (W), 83.3, 71.5; 324/61, 83 (FCE), 78, 79

[56] References Cited
UNITED STATES PATENTS

| 2,991,364 | 7/1961 | Goodman............... | 250/83.6W |
| 3,155,901 | 11/1964 | Hanken................. | 324/61 |
| 3,164,720 | 1/1965 | Armistead............. | 250/83.6W |
| 3,358,142 | 12/1967 | Hopkinson et al..... | 250/83.6W |
| 3,373,280 | 3/1968 | Mills, Jr................ | 250/83.6W |
| 3,379,882 | 4/1968 | Youmans.............. | 250/83.6W |
| 3,379,884 | 4/1968 | Youmans.............. | 250/83.6W |
| 3,402,294 | 9/1968 | Bargainer, Jr......... | 250/83.6W |

Primary Examiner—Archie R. Borchelt
Assistant Examiner—Morton J. Frome
Attorney—Brumbaugh, Free, Graves and Donohue ABSTRACT: In the particular embodiments of the invention described herein, the formation surrounding a well bore is irradiated with a burst of neutrons and the neutron concentration is observed during selected time intervals after irradiation to determine the thermal neutron decay time characterizing the formation. In one embodiment, the neutron concentration is observed during a first interval one decay time long and during a second and subsequent interval two decay times long which starts immediately after the first interval. In another embodiment the two intervals are spaced by one decay time.

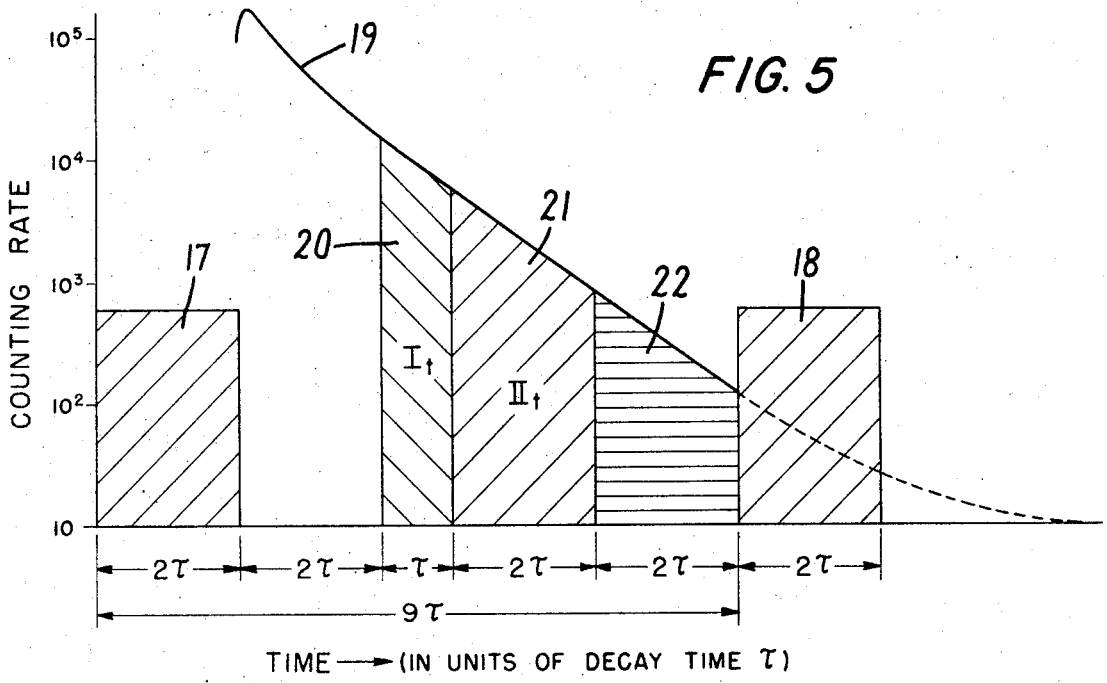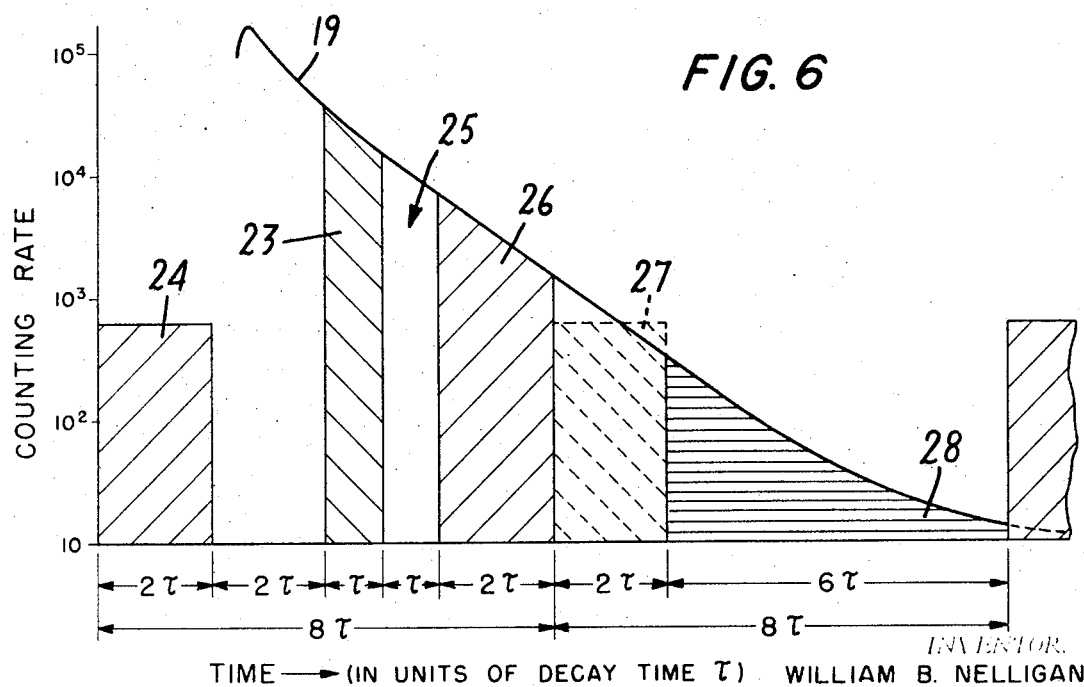

INVENTOR.
WILLIAM B. NELLIGAN

з,566,116

METHOD AND APPARATUS FOR MEASURING NEUTRON CHARACTERISTICS OF A MATERIAL SURROUNDING A WELL BORE

This invention relates to measurement of the neutron characteristic time constants of an unknown material such as the decay time of thermal neutrons therein and, more particularly, to a new and improved method and apparatus for measuring neutron characteristic time constants more accurately and rapidly.

One procedure for determining the character of unknown materials, such as the earth formations through which a well bore passes, comprises irradiating the material with neutrons for a selected period of time and then determining the concentration of neutrons in the material at selected times after irradiation so that a neutron characteristic time constant of the material maybe ascertained. Because the various elements capture thermal neutrons at different rates, the change of thermal neutron concentration with time following irradiation will be different for materials containing different elements so that a determination of the rate of capture can be used to give an indication of the type of material irradiated. Usually, this neutron characteristic of the material is expressed as the thermal neutron decay time, which is the time required for the thermal neutron concentration to decrease by a factor equal to the natural logarithm base $e$ which is 2.718. In another procedure the characteristic of the material known as the neutron slowing down time is determined by measuring the concentration of higher energy neutrons at various times after irradiation.

When the earth formation material adjacent to a well bore is being analyzed, the variation of neutron concentration with time during the period immediately following irradiation is influenced to a large extent by material in the well bore. As the thermal neutron intensity reaches a low level, moreover, measurements are altered by background and noise effects. Consequently, there is only a certain period of time during which the neutron characteristic time constants such as the thermal neutron decay time of the formation material can be determined accurately. The rate of decay of thermal neutrons with time and the slowing down time of higher energy neutrons vary widely for different formation materials, however, so that the proper time interval following neutron irradiation for characteristic time constant measurements is not the same for different formations and, heretofore, it has been necessary to measure the neutron concentration at many different times after neutron irradiation in order to obtain an accurate determination of a neutron characteristic time constant.

Accordingly, it is an object of the present invention to provide a new and improved method for measuring neutron characteristic time constants which overcomes the abovementioned disadvantages of present methods.

Another object of the invention is to provide a new and improved apparatus giving immediate and accurate indications of the thermal neutron decay time of a material being analyzed.

These and other objects of the invention are attained by measuring the rate of change of the neutron intensity so as to indicate the neutron characteristic time constant of the material at a time after neutron irradiation which is dependent upon the characteristic time constant of the material. In this way, thermal neutron decay time measurements, for example, can be made at the proper time for all materials regardless of whether the thermal neutron concentration decreases rapidly or slowly. Moreover, the durations of the time intervals during which the neutron characteristic time constant measurements are made are also varied in accordance with the time constant of the material so that the ratio of the neutron counting rates is a predetermined number when the time intervals are properly selected. For optimum operation, the duration of the neutron irradiation intervals are also proportional to the time constant.

In a particular embodiment for thermal neutron decay time measurements utilizing continuously repetitive bursts of neutron irradiation spaced at intervals about nine decay times in length, a first thermal neutron count is taken during an interval one decay time long which begins two decay times after the irradiation has stopped and a second thermal neutron count is taken during a second interval immediately after the first interval which is two decay times long. Preferably, the thermal neutron intensity may be measured by a detector which detects the capture gamma rays produced in the formation. With this type of detector, it is preferable to take a background count during an interval beginning at least seven decay times after the neutron irradiation has stopped. This background count is subtracted from both of the first and second interval counts in proportion to their duration. In another embodiment, improved results are obtained by spacing the first and second time intervals by one decay period. In this case, every fourth neutron burst is omitted and the background is measured only during a period at least eight decay times after the third burst, the three neutron bursts being two decay times along and occurring at intervals of eight decay times.

In the first embodiment, when the adjacent time intervals are properly set at one and two decay times, respectively, the ratio of the counting rate in the first interval to the counting rate in the second interval is a fixed number 1.99. Consequently, the time intervals are adjusted in a two to one ratio until the ratio of counting rates equals 1.99 and the delay between irradiation and measurement is adjusted to be twice the first time interval. In the second embodiment the procedure is similar except the intervals are adjusted to obtain a counting rate ratio of 5.40.

Apparatus for determining thermal neutron decay times according to the invention includes a variable oscillator for initiating and terminating the measurement intervals. The period of this oscillator determines the ratio of thermal neutron counting rates in the first and second intervals. Preferably, the oscillator controls two gates arranged to transmit pulses from a radiation detector during the first and second intervals and also operates a third gate at a later time to provide background count information. The background counting rate is subtracted from the counting rates during the first and second time intervals and a ratio detector computes the ratio of the net counting rates. A difference circuit responds to any difference between the measured counting rate ratio and the value which must result when the first and second intervals are one and two decay times, respectively, and adjusts the oscillator in the proper direction to eliminate any difference.

Further objects and advantages of the invention will be apparent from a reading of the following description in conjunction with the accompanying drawings in which:

FIG. 5 is a graphical representation of detector counting rate versus time illustrating one embodiment of the method for determining thermal neutron decay time according to the invention;

FIG. 6 is a graphical representation of detector counting rate versus time illustrating another embodiment of the method for determining thermal neutron decay time.

Figure 1:
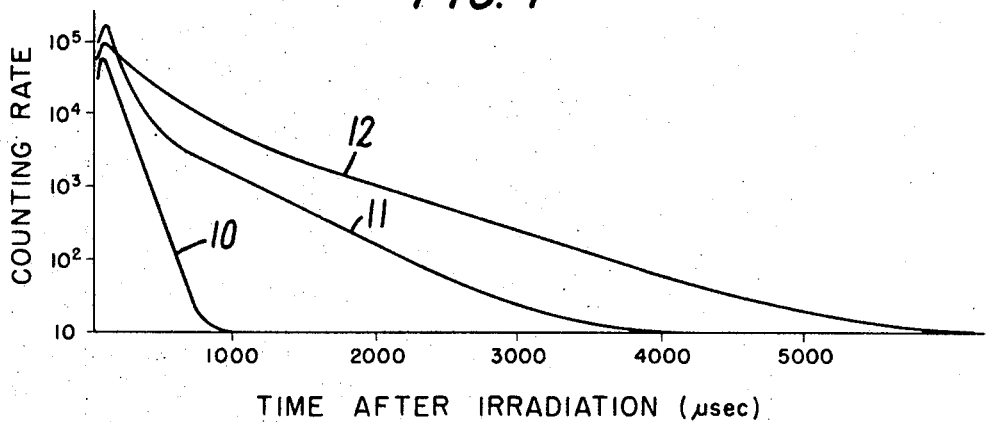
FIG. 1 is a graphical representation illustrating the variation in counting rate versus time after neutron irradiation for three different types of earth formation surrounding a well bore as detected by a radiation detector disposed in the well bore and adapted to respond to indications of thermal neutron intensity.

In the graphical representation of FIG. 1, three curves 10, 11 and 12 represent, respectively, the logarithm of the counting rate after background subtraction versus time for a detector of thermal neutrons or of neutron capture gamma rays disposed in a well bore following neutron irradiation of formations having short, medium and long decay times or rates of decrease of thermal neutron intensity. The curve 10 represents the response of a 40 percent porous sandstone formation containing brackish water having about 250,000 p.p.m. of salt, while the curve 11 indicates the response of 18 percent porous sandstone containing oil and water, the curve 12 showing the response obtained from zero porosity sandstone. For purposes of comparison, the curves of FIG. 1 have been normalized to approximately the same peak counting rate although, in actual practice, this does not generally occur. The variation in counting rate with respect to time may, in each case, be expressed as a function $M(t)$ and at any time $t$, the decay time $\tau$ is defined as $$\tau(t) = -\frac{M(t)}{\frac{dM(t)}{dt}} \quad (1)$$

When $M(t)$ is a decreasing exponential function, $\tau$ is a constant equal to the time required for the counting rate to decrease by the factor $e$.

Figure 2:
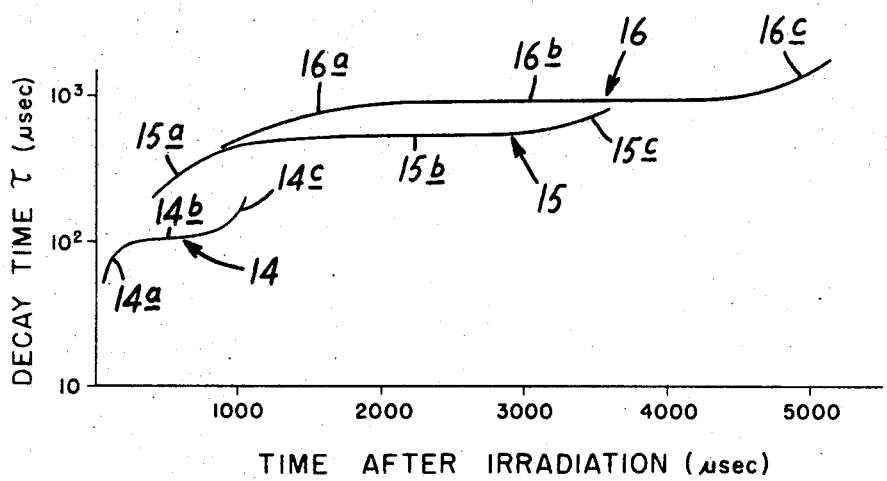
FIG. 2 is a graphical representation showing the variation in indicated decay time versus time after neutron irradiation for the three curves shown in FIG. 1.

It will be readily apparent that the decay time $\tau$ will vary with time whenever the logarithm of counting rate versus time as represented in FIG. 1 is not a straight line. In this regard, the curves 14, 15 and 16 of FIG. 2 illustrate the variation in $\tau$ with time for the typical counting rate curves 10, 11 and 12 of FIG. 1. It will be observed from these curves that, in each case, the decay time curve has an initial portion 14a, 15a, 16a which increases with time a central portion 14b, 15b, 16b in which the decay time is substantially constant and a final portion 14c, 15c, 16c in which the decay time again increases with time. Because the constant decay time portions 14b, 15b, 16b, which most closely represent the actual decay time of the formation material, do not occur at the same time, it is impossible to select any specific time interval after neutron irradiation for measurement of decay times which will provide an accurate decay time indication for all types of earth formations. For example, the proper time interval for measuring the decay time of the material producing the curve 14 is about 200 to 500 microseconds after irradiation, whereas that for the curve 15 is about 1,000 to 2,500 microseconds after irradiation and that for the curve 16 is about 1,800 to 4,500 microseconds after irradiation.

In accordance with the invention, therefore, the decay time measurement is made at a time after irradiation which is dependent upon the value of the decay time so that the time of measurement coincides with the time at which the curve provides an accurate decay time indication, i.e., where the decay time is substantially constant. Stated another way, the amplitude and time scales of the curves 10, 11 and 12 are each changed by factors which cause the curves to coincide over the regions which correspond to the central regions 14b, 15b, and 16b, of the corresponding curves in FIG. 2 the time scale factor for each curve being the decay time $\tau$ for the curve. Inasmuch as the time scale factor must be $\tau$ to provide the desired result, let the counting rate corresponding to a particular curve be $$M_i(t) = M_i\left(\tau_i \frac{t}{\tau_i}\right) = N_i\left(\frac{t}{\tau_i}\right) = N_i(x^{(i)}) \quad (2)$$

where $$x^{(i)} = \frac{t}{\tau_i} \quad (3)$$

Figure 3:
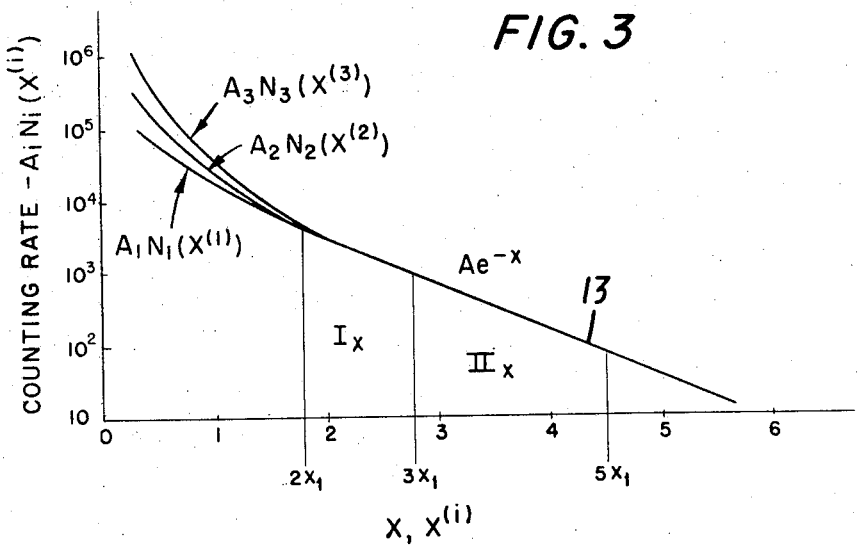
FIG. 3 is a graphical representation showing a family of curves having different scale factors.

In this notation the term $(i)$ is used as a superscript and not as an exponent. Since the various functions $Mi(t)$ differ by scale factors in both time and amplitude in the constant $\tau$ region, the appropriate time scale factors $\tau_i$ and amplitude scale factors $A_i$ define for each function $Mi(t)$ a corresponding function $A_i Ni (x^{(i)})$. A family of such curves is shown in FIG. 3. In the constant $\tau$ region of interest, however, these functions are approximated by the function $$N(x) = Ae^{-x} \quad (4)$$ as indicated by the common portion 13 of the curves in FIG. 3.

Figure 4:
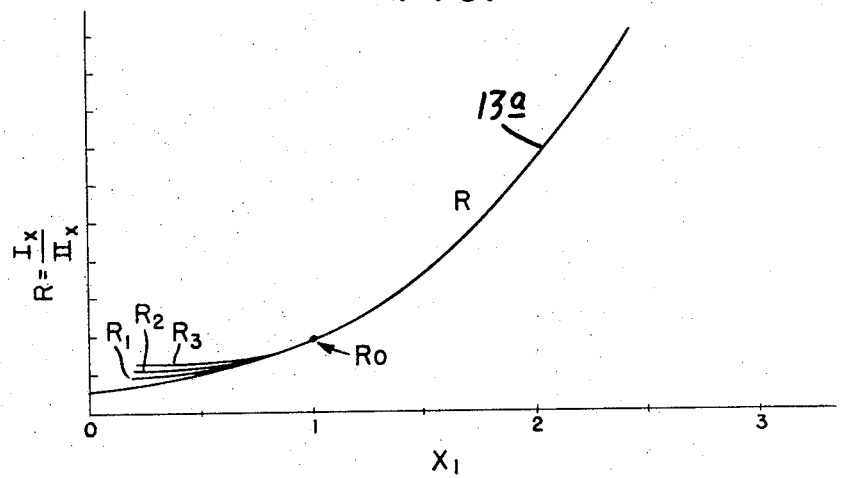
FIG. 4 is a graphical representation showing the variation in the ratio of selected areas under the curves of FIG. 3 with changes in the scale of measurement.

In order to determine the scale factor $\tau$ for any given counting rate curve, the ratio of the areas under the asymptotic curve $Ae^{-x}$ for two adjoining $x$ intervals $I_x$ and $II_x$ in the common region 13 is determined. The relative position and widths of the intervals are chosen to optimize the accuracy of the decay time measurement. For the first embodiment the positions of the interval boundaries are depicted on FIG. 3 wherein they are defined to be in a specific proportion to a single parameter $X_1$. The ratio of the areas R is therefore a monotonically increasing function of $X_1$ which is shown on FIG. 4 by the curve 13a. Therefore any desired position of the X intervals and in particular the region 13 on FIG. 3, can be selected by specifying the associated value of R.

As indicated by equation (3), for constant $\tau$ as occurs in the central region of each of the thermal neutron decay curves 10, 11 and 12, there will be two corresponding time intervals $I_t$ and $II_t$ for which the ratio of the areas under the curves, i.e., the ratio of counting rates during the time intervals, will be the same as the ratio of the areas $I_x$ and $II_x$ under the curve $Ae^{-x}$. The correct value of the scale factor for each curve which will cause this equality of the counting rate ratio curve to the asymptotic ratio curve is the decay time $\tau$. The measurement is performed by maintaining the counting intervals and the interval from the end of irradiation to the first counting interval in the same fixed proportion to a time parameter $t_1$ as the corresponding $x$ intervals bear to the parameter $X_1$. The parameter $t_1$ is then varied until the ratio of the interval counting rates is equal to the selected value Ro.

The required scale factor or decay time $\tau_i$ is then obtained from equation (3) by substituting for $X^{(i)}$ the value of $X_1$ associated with Ro and for the value of $t_1$ which produces the counting rate ratio equal to Ro and solving for $\tau_i$. Since the functions $AiNi (X^{(i)})$ essentially coincide with $Ae^{-x}$ in the region 13 on FIG. 3, the value of $\tau_i$ determined in this manner will be unique and will not vary substantially with the particular value selected for Ro provided that it corresponds to intervals in the asymptotic region 13 on FIG. 3.

Consideration of the shape of the counting rate function indicates that the most accurate determinations of the scale factor are provided when the counting intervals begin at least two decay times after termination of the neutron irradiation and the second counting interval is longer than the first. In a particular example illustrated in FIG. 5 wherein neutron irradiation bursts 17 and 18 are provided at nine decay time intervals as a downhole instrument is moved through the well bore, the curve 19 represents the thermal neutron count as measured by a detector in the well bore at subsequent times indicated in terms of the decay time $\tau$. As a practical matter, the decay time usually varies between about 70 microseconds and about 1,000 microseconds depending upon the nature of the formation material as indicated by FIG 2, so that the separation of nine decay periods from the beginning of one neutron burst to the beginning of the next may be as low as about 630 microseconds for formations having a rapidly decaying thermal neutron concentration and as high as about 9,000 microseconds for formations having slowly decaying thermal neutron concentration. Moreover, the length of the neutron irradiation periods 17 and 18 is also scaled according to the decay time of the formation and, in the illustrated example, the neutron irradiation lasts for an interval of two decay times. Where more intense neutron irradiation is possible, however, the duration of neutron irradiation may be reduced so as to leave more time for measurement between irradiation bursts, or closer spacing of bursts.

In the example of FIG. 5, optimum measurement of the decay time is obtained by initiating the first counting rate measurement interval 20 two decay times after termination of the irradiation burst 17 and making that interval one decay time long. The second counting rate measurement interval 21 commences immediately after the first and is two decay times long while the remaining interval 22 of two decay times before the next irradiation period 18 is used to provide a measurement of the background counting rate. After subtraction of the counting rate in the interval 22 from that in the interval 21 and one-half of the interval 22 counting rate from that in the interval 20, the ratio of the net counting rates in the first two intervals is taken.

For an exponential decrease in counting rate as occurs in the central section of the curve 19, the ratio of the net counting rates in the intervals 20 and 21 should be 1.99 if the time intervals are actually one decay time and two decay times long, respectively. Accordingly, the time scale of the measuring operation is adjusted until the ratio of counting rates is equal to about 1.99 and, when that condition obtains, the duration of the first measuring time interval 20 is equal to the decay time. This may be indicated either by providing a signal representing the number of microseconds elapsed during the first counting interval or, where the time scale is varied by utilization of a variable frequency oscillator, as in the example described hereinafter, by providing an output signal having an inverse relation to the frequency of the oscillator. The macroscopic capture cross section is inversely proportional to the decay time and may therefore be obtained by bringing out a signal proportional to the oscillator frequency.

The accuracy of determination of the decay time may be increased, if desired, by separating the first and second measurement intervals somewhat. In the further embodiment of the invention shown in FIG. 6, the first counting rate measuring interval 23 is one decay time long and starts two decay times after the end of the neutron burst 24 which is two decay times long as in the previous embodiment. In this case, an interval of time 25, which is one decay time long, separates the first counting interval 23 from the second counting interval 26, the latter being two decay times in length. This procedure has been found to reduce the uncertainty in measured decay time to about 60 percent of that obtained when the example illustrated in FIG. 3 is used when the background counting rate is relatively low.

In order to provide a background counting rate measurement which is affected less by the decaying counting rate caused by the thermal decay process, the neutron irradiation bursts in the FIG. 6 example occur at intervals of eight decay times, except that every fourth irradiation burst 27 is suppressed and the background counting rate is measured in an interval 28 six decay times long which starts at the end of the suppressed neutron burst 27. This background counting rate is subtracted from the measurements made during the second interval 26 following each of the three succeeding irradiation bursts, after which another background counting rate measurement is made when the next irradiation burst is omitted. Similarly, this background counting rate is divided by two for proper normalization before it is subtracted from the counting rate measured during first rate interval 23 following each of the three succeeding irradiation bursts. For an asymptotic curve, the ratio of the areas in first and second intervals corresponding to the intervals 23 and 26 is approximately 5.40. Accordingly, in this case, the time scale of the measurement is adjusted until the ratio of net counting rates in the intervals 23 and 26 is 5.40 and, when that condition obtains, the duration of the first interval 23 is equal to the decay time.

Figure 7:
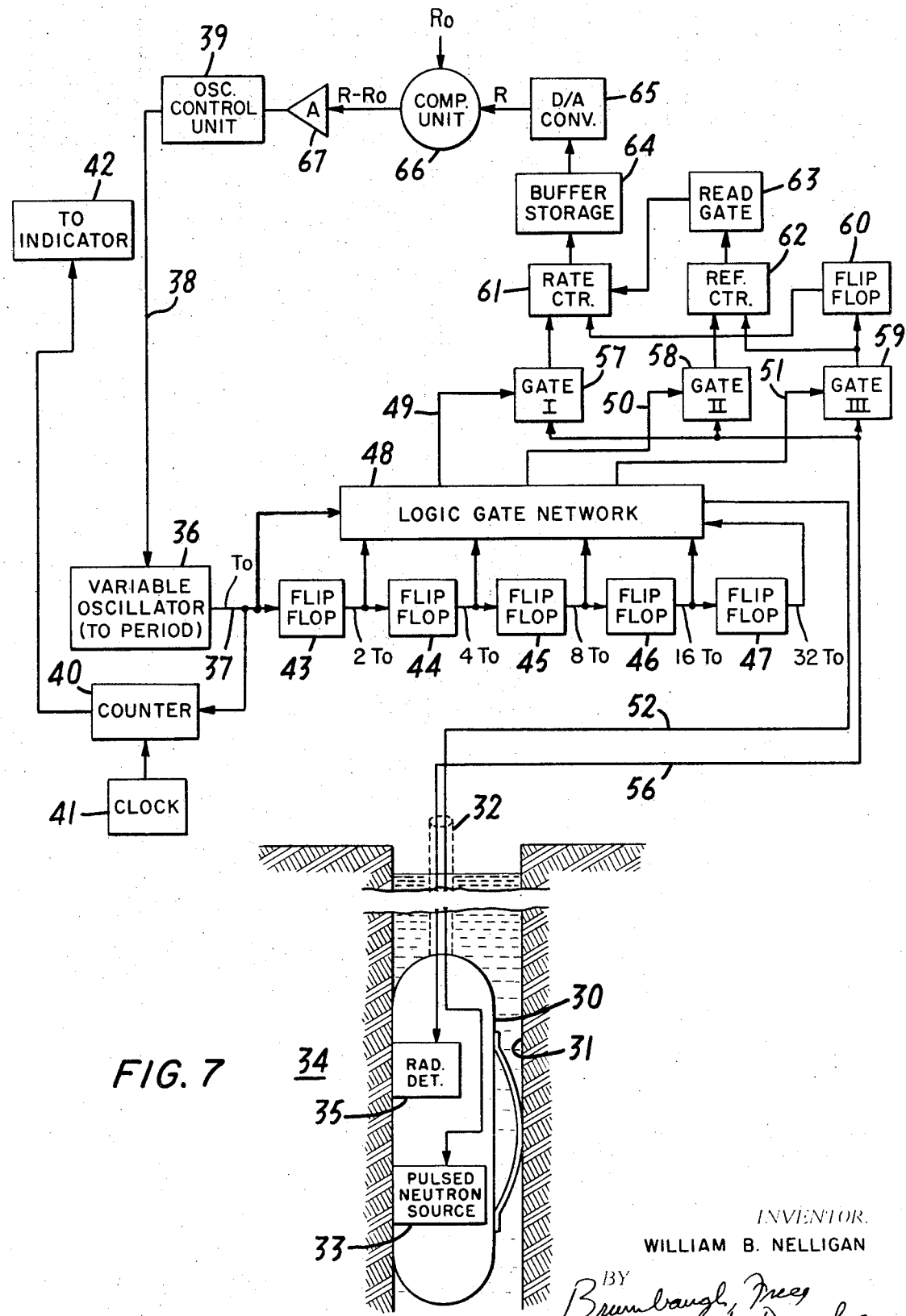
FIG. 7 is a schematic block diagram illustrating a representative apparatus for measuring thermal neutron decay times according to the invention.

In a representative arrangement of apparatus for measuring decay times according to the invention illustrated in FIG. 7, a downhole instrument 30 is drawn through a well bore 31 by a multiconductor cable 32. Within the instrument 30, a burst neutron source 33, which may be of the type described in the U.S. Pat. No. 2,991,364 issued Jul. 4, 1961, to Goodman, for "Well Logging," is positioned to irradiate the formation 34 adjacent to the well bore with neutrons. In addition, a radiation detector 35 is disposed within the instrument 31 in spaced relation above the source 33 and is positioned to respond in proportion to the concentration of thermal neutrons in the formation 34. In this regard, the detector 35 may be either a detector of thermal neutrons as, for example, a scintillation crystal coated with boron trifluoride or it may be a gamma ray detector adapted to respond to gamma rays resulting from capture of thermal neutrons by nuclei of elements in the formation 34.

At the surface of the earth, a variable frequency oscillator 36 produces output pulses on a line 37 which are separated by equal time intervals $T_o$, the time intervals being controlled in duration by a signal on a control line 38 from an oscillator control unit 39. A counter 40, receiving time signals from a clock 41, is actuated by the oscillator output signals on the line 37 at intervals $T_o$ to transmit to a $T_o$ indicator 42 a signal indicating the number of microseconds in the intervals $T_o$. When the ratio of counting rates in the two counting intervals is correct, this number is equal to the decay time $\tau$ of the formation as explained above.

Five factor units 43, 44, 45, 46 and 47 which may, for example, contain conventional flip-flop circuits connected in series to the line 37, successively increase the period of the oscillator output signal by factors of two so that the output signals from these units occur at intervals of $2T_o$, $4T_o$, $8T_o$, $16T_o$, and $32T_o$ respectively. In order to control the time intervals in which neutron irradiation and subsequent thermal neutron concentration measurement takes place, a network of logic gates 48 receives signals from the oscillator 37 and from the units 43, 44, 45, 46 and 47 and is arranged to provide output signals at the required times. The logic gate network may be arranged in any conventional manner to accomplish the desired result as by utilizing appropriate gates and additional flip-flop units.

The typical apparatus illustrated in FIG. 7 is arranged to operate in the manner described in connection with FIG. 6 irradiating at intervals of eight decay times with every fourth neutron burst suppressed, the background counting rate being measured after the third neutron irradiation. Accordingly, the logic gate network 48 has four output conductors 49, 50, 51 and 52 providing signals at selected intervals according to the sequence indicated in FIG. 6, the logic network being reset at $32T_o$ to initiate another series of irradiation and measurement cycles. Operation of the pulsed neutron source 33 is controlled by signals on the line 52 from the unit 48 so as to initiate irradiation for a time $2T_o$ at intervals of $8T_o$ except when irradiation is omitted at the time $24T_o$.

Signals from the radiation detector 35 representing the thermal neutron concentration in the formation 34 following neutron irradiation are transmitted by way of a conductor 56 to three gate units 57, 58 and 59. The gate 57, opened at times $4T_o$, $12T_o$, and $20T_o$, and closed at $5T_o$, $13T_o$ and $21T_o$ respectively transmits signals on the line 49 signals representing the counting rate during the first measuring interval designated 23 in FIG. 6 in each of the first three $8T_o$ cycles of operation. Similarly, the gate 58, opened at $6T_o$, $14T_o$ and $22T_o$, and closed at $8T_o$, $16T_o$ and $24T_o$ by signals on the line 50, transmits signals representing the counting rate during the second interval designated 26 in FIG. 6 in each of the first three $8T_o$ cycles of operation.

After the time when the fourth neutron irradiation burst has been suppressed at $24T_o$, the gate 59 is opened at $26T_o$ and closed at $32T_o$ by signals on the line 51 so as to transmit the background counting rate during the interval designated 28 in FIG. 6. It will be understood, of course, that the background counting rate may be measured at any time after $24T_o$ and, if necessary to provide a high enough counting rate, it may be measured during the entire period from $24T_o$ to $32T_o$. This signal is transmitted through a flip-flop 60, which divides the count rate by two, to a rate counter 61 and directly to a reference counter 62, the counters 61 and 62 also being connected to receive signals from the gates 57 and 58 respectively. These counters may be conventional bidirectional or "forward and backward" counters, which count in the forward direction when they receive signals from the gates 57 and 58, respectively, and count in the backward direction when they receive signals from the background gate 59.

The ratio of the differences representing the net thermal neutron concentration in the intervals 23 and 26 is determined by reading out the count in the rate counter when the reference counter has reached a predetermined value as detected by a read gate 63. Both the counters are reset to specific initial states after each readout but the net count accumulated in the rate counter at the time of readout is transferred to a buffer storage unit 64. Since the net count in the reference counter is equal to the same predetermined value at each readout, the numbers stored in the buffer storage unit 64 at each readout are proportional to the value of the ratio R of net counting rates in the intervals 23 and 26. The count in the buffer storage 64 is converted to an analogue voltage in a digital to analogue converter unit 65, the output of which is therefore proportional to the aforesaid counting rate ratio R. A comparing unit 66 compares this measured counting rate ratio with a fixed reference ratio $R_o$ which, in the illustrated example, is 5.40 and any difference is amplified by an amplifier 67 and supplied to the oscillator control unit 39. That unit, in turn, changes the frequency of the variable oscillator 36 by way of the control line 38 to maintain the difference between R and $R_o$ as close to zero as possible. In this condition, the reading of the oscillator period $T_o$ on the indicator 42 is substantially equal to the decay time characterizing the formation being irradiated as exemplified in the curves 10, 11 and 12 of FIG. 1. If desired, the decay time may also be indicated by taking the reciprocal of the oscillator frequency as commanded by the oscillator control line 38. Moreover, either the indicator 42 or an indicator of the reciprocal of oscillator frequency, or both, may be arranged to record the decay time continuously against depth as the instrument 30 moves through the well bore. The information processing features of the embodiment of the invention shown in FIG. 6 can be accomplished by an arrangement of known digital, analogue or hybrid computer components.

In operation, as the downhole instrument 30 is drawn upwardly in the well bore 31 by the cable 32, the neutron source 33 is pulsed at intervals under the control of signals on the line 52. The resulting indications of thermal neutron concentration produced by the detector 35 are transmitted over the conductor 56 to the gates 57, 58 and 59. Subtraction of the background counting rate detected by the gate 59 in proportion to the length of the intervals 23 and 26 provides a net counting rate for each interval and the ratio taken by the unit 65 after a selected count is attained in the second interval is compared in the unit 66 to a desired ratio value. Any difference between these values causes the oscillator control unit 39 to correct the frequency of the variable oscillator 36 so that its period is equal to the thermal neutron decay time of the formation.

From the foregoing, it will be apparent that the method and apparatus of the present invention provide not only an extremely simple way of measuring thermal neutron decay times which yields an immediate result but also one in which the determination is more accurate because the durations of neutron irradiation bursts and of counting rate detection intervals and times are varied in accordance with the decay time, thereby permitting detection at the optimum time in each decay curve and allowing higher counting rates in every instance. It will be understood, moreover, that the method and apparatus of the invention may be used for measuring other neutron characteristic time constants of a material than thermal neutron decay time as, for example, the neutron slowing down time.

Although the invention has been described herein with reference to specific embodiments, many modifications and variations therein will readily occur to those skilled in the art. Accordingly, all such variations and modifications are included within the intended scope of the invention as defined by the following claims.

I claim:

1. A method for logging a characteristic of an unknown material comprising irradiating the material with neutrons during at least two spaced irradiation intervals, detecting indications of the neutron concentration in the material during first and second periods, respectively, after commencement of the corresponding irradiation interval, determining a neutron characteristic of the material from the detected indications occurring during at least one measurement interval during the respective periods, the time of occurrence of at least one measurement interval during the second period being variable, and controlling automatically the variable time of at least one measurement interval during the second period in accordance with the neutron characteristic determined from the indications detected during the first period in the same logging run.

2. A method according to claim 1 including the steps of detecting indications of the thermal neutron concentration in the material during the first and second periods, determining the thermal neutron decay time of the material from indications detected during the first period, and controlling the time of at least one measurement interval during the second period in a manner tending to optimize the measurement of neutron concentration indications for determination of the thermal neutron decay time.

3. A method according to claim 3 including the steps of detecting indications of the concentration in the material of neutrons having greater than thermal energy during the first and second periods, determining the neutron slowing down time from indications detected during the first period, and controlling the time of at least one measurement interval during the second period so as to optimize the measurement of neutron concentration indications for determination of the neutron slowing down time.

4. A method for logging a characteristic of an unknown material comprising irradiating the material with neutrons during at least two spaced irradiation intervals, detecting indications of the neutron concentration in the material during first and second periods, respectively, after commencement of the corresponding irradiation interval, measuring the detected indications at least during a first measurement interval occurring at first times during the respective periods and during a second measurement interval occurring at second times during the respective periods, at least one of the second irradiation interval, the first and second times in the second period, and the first and second measurement intervals during the second period being variable, determining a neutron characteristic of the material from the measurements made during the first and second measurement intervals in the first period, and controlling automatically the duration of at least one of the second irradiation interval, the first and second times in the second period, and the first and second measurement intervals in the second period, in accordance with the neutron characteristic of the material determined from the measurements made during the first period of the same logging run.

5. A method according to claim 4 wherein the duration of the first time in the second period is controlled in accordance with the neutron characteristic determined from the measurements made during the first period.

6. A method according to claim 4 wherein the duration of the second time in the second period is controlled in accordance with the neutron characteristic determined from the measurements made during the first period.

7. A method according to claim 4 wherein the duration of the first measurement interval in the second period is controlled in accordance with the neutron characteristic determined from the measurements made during the first period.

8. A method according to claim 4 wherein the duration of the second measurement interval in the second period is controlled in accordance with the neutron characteristic determined from the measurements made during the first period.

9. A method according to claim 4 wherein the duration of the second irradiation interval in the second period is controlled in accordance with the neutron characteristic determined from the measurements made during the first period.

10. A method according to claim 4 wherein the durations of the first and second selected times in the second period are controlled in accordance with the neutron characteristic determined from the measurements made during the first period.

11. A method according to claim 4 wherein the durations of the first and second measurement intervals in the second period are controlled in accordance with the neutron characteristic determined from the measurements made during the first period.

12. A method according to claim 4 wherein the neutron characteristic of the material is determined by comparing the measurement made during the first measurement interval of the first period with the measurement made during the second measurement interval of the first period.

13. A method according to claim 4 wherein the first measurement interval has a duration approximately equal to a neutron characteristic time constant of the material and the second measurement interval has a duration approximately equal to twice the same neutron characteristic time constant of the material.

14. A method according to claim 4 wherein the first and second measurement intervals are substantially contiguous.

15. A method according to claim 4 wherein the first and second measurement intervals are spaced by an interval approximately equal to a neutron characteristic time constant of the material.

16. A method according to claim 4 wherein the first and second measurement intervals are within a time period extending from about twice the characteristic time constant of the material after the corresponding irradiation interval to about six times the neutron characteristic time constant of the material after the corresponding irradiation interval.

17. A method according to claim 4 wherein the duration of the irradiation intervals is approximately equal to twice the neutron characteristic time constant of the material.

18. A method for logging a characteristic of an unknown material comprising irradiating the material with neutrons during at least two spaced irradiation intervals, detecting indications of the neutron concentration in the material during first and second periods, respectively, after commencement of the corresponding irradiation interval, measuring the detected indications at least during a first measurement interval occurring at first times during the respective periods and during a second measurement interval occurring at second times during the respective periods, at least one of the second irradiation interval, the first and second times in the second period, and the first and second measurement intervals during the second period being variable, determining a neutron characteristic of the material from the measurements made during the first and second measurement intervals in the first period, controlling automatically the duration of at least one of the second irradiation interval, the first and second times in the second period, and the first and second measurement intervals in the second period, in accordance with the neutron characteristic of the material determined from the measurements made during the first period of the same logging run, measuring detected indications representative of background radiation during a third measurement interval occurring at third times during the first and second periods, respectively, and subtracting the measurement obtained during the third measurement interval from the measurements obtained during the first and second measurement intervals in the same logging run in determining the neutron characteristic.

19. A method for logging a characteristic of an unknown material comprising irradiating the material with neutrons during at least two spaced irradiation intervals, detecting indications of the neutron concentration in the material during first and second periods, respectively, after commencement of the corresponding irradiation interval, measuring the detected indications at least during a first measurement interval occurring at first times during the respective periods and during a second measurement interval occurring at second times during the respective periods, at least one of the second irradiation interval, the first and second times in the second period, and the first and second measurement intervals during the second period being variable, determining a neutron characteristic of the material from the measurements made during the first and second measurement intervals in the first period, controlling automatically the duration of at least one of the second irradiation interval, the first and second times in the second period, and the first and second measurement intervals in the second period, in accordance with the neutron characteristic of the material determined from the measurements made during the first period of the same logging run, measuring detected indications representative of background radiation during a third measurement interval occurring at third times during the first and second periods, respectively, subtracting the measurement obtained during the third measurement interval from the measurements obtained during the first and second measurement intervals in the same logging run in determining the neutron characteristic, and controlling automatically the third time in the second period in accordance with the neutron characteristic determined from the measurements made during the first period of the same logging run.

20. A method for logging a characteristic of an unknown material comprising irradiating the material with neutrons during at least two spaced irradiation intervals, measuring the rate of change of neutron concentration in the material during corresponding first and second measuring intervals occurring after commencement of the respective irradiation intervals, the time of occurrence of the second measuring interval being variable, and controlling automatically the time of the second measuring interval in accordance with a neutron characteristic of the material determined from a measurement made during the first measuring interval in the same logging run.

21. Apparatus for logging a characteristic of an unknown material based upon successive detected indications of the neutron concentration in the material following successive irradiations of the material with neutrons during the same logging run comprising conductor means for receiving signals representing the detected indications and synchronizing signals related to the time of initiation of each neutron irradiation, at least one variable gate means responsive to the synchronizing signals and the neutron concentration indication signals for transmitting neutron concentration indication signals during at least one corresponding measurement interval occurring at at least one measurement time after receipt of a synchronizing signal, comparing means responsive to the neutron concentration indication signals transmitted by the gate means to produce a comparison signal related to the neutron concentration in the material at the measurement time, and control means responsive to the comparison signal to produce a control signal for controlling automatically the operation of the gate means, wherein the control means includes variable frequency oscillator means responsive to the comparison signal to produce a control signal having a controlled frequency.

22. Apparatus for logging a characteristic of an unknown material based upon successive detected indications of the neutron concentration in the material following successive irradiations of the material with neutrons during the same logging run comprising conductor means for receiving signals representing the detected indications and synchronizing signals related to the time of initiation of each neutron irradiation, at least one variable gate means responsive to the synchronizing signals and the neutron concentration indication signals for transmitting neutron concentration indication signals during at least one corresponding measurement interval occurring at at least one measurement time after receipt of a synchronizing signal, comparing means responsive to the neutron concentration indication signals transmitted by the gate means to produce a comparison signal related to the neutron concentration in the material at the measurement time, and control means responsive to the comparison signal to produce a control signal for controlling automatically the operation of the gate means.

23. Apparatus according to claim 22 including second gate means responsive to the synchronizing signals and the neutron concentration signals for transmitting neutron concentration indication signals during a second measurement interval occurring at a second measurement time after receipt of a synchronizing signal.

24. Apparatus according to claim 23 wherein the control means includes means for producing a control signal for controlling the selected measurement time of at least one gate means.

25. Apparatus according to claim 23 wherein the control means includes means for producing a control signal for controlling the measurement interval of at least one gate means.

26. Apparatus according to claim 23 wherein the control means includes means for producing control signals for controlling the selected measurement time and the measurement intervals of both gate means.

27. Apparatus according to claim 22 including output means responsive to the control means for providing indications of a characteristic of the unknown material.

28. Apparatus for logging a characteristic of an unknown material comprising neutron source means for irradiating the material with neutrons for an irradiation interval upon receipt of a control signal, at least one of the time and duration of the irradiation interval being variable, detector means for producing indications of the neutron concentration in the material following each irradiation signal during the same logging run, at least one gate means for transmitting signals from the detector means during at least one measurement interval, comparing means responsive to the neutron concentration indication signals transmitted by the gate means to produce a comparison signal related to the neutron concentration in the material at the measurement time, and control means responsive to the comparison signal to produce a control signal for controlling automatically the operation of the neutron source means.

29. Apparatus according to claim 28 wherein the control means include includes means for producing a control signal which controls the duration of the irradiation interval.

30. Apparatus according to claim 28 wherein the control means includes means for producing a control signal which controls the spacing of successive irradiation intervals.

31. Apparatus for logging a characteristic of an unknown material comprising neutron source means for irradiating the material with neutrons for an irradiation interval upon receipt of a control signal, detector means for producing indications of the neutron concentration in the material following each irradiation signal during the same logging run, at least one variable gate means for transmitting signals from the detector means during at least one measurement interval at a measurement time, at least one of the measurement interval and the measurement time being variable, comparing means responsive to the neutron concentration indication signals transmitted by the gate means to produce a comparison signal related to the neutron concentration in the material at the measurement time, and control means responsive to the comparison signal to produce a control signal for controlling automatically the operation of the variable gate means.

32. Apparatus according to claim 31 wherein the control means includes means for producing a control signal which controls the duration of the measurement interval.

33. Apparatus according to claim 31 wherein the control means includes means for producing a control signal which controls the selected measurement time.

PO-1050
(5/69)

UNITED STATES PATENT OFFICE
CERTIFICATE OF CORRECTION

Patent No. 3,566,116  Dated February 23, 1971

Inventor(s) William B. Nelligan

It is certified that error appears in the above-identified patent and that said Letters Patent are hereby corrected as shown below:

Column 2, line 21, "along" should be -- long --;
Column 3, line 40, after "15b" should be -- and --;
Column 4, line 4, "Ni" should be -- $N_i$ --;
Column 4, line 41, after "for" should be -- $t$ --;

Column 5, line 74, "Jul." should be -- July --;
Column 8, line 25, "3" should be -- 1 --;
Column 12, line 5, delete "include".

Signed and sealed this 9th day of November 1971.

(SEAL)
Attest:

EDWARD M. FLETCHER, JR.          ROBERT GOTTSCHALK
Attesting Officer                 Acting Commissioner of Patent